United States Patent Office 3,559,064
Patented Jan. 26, 1971

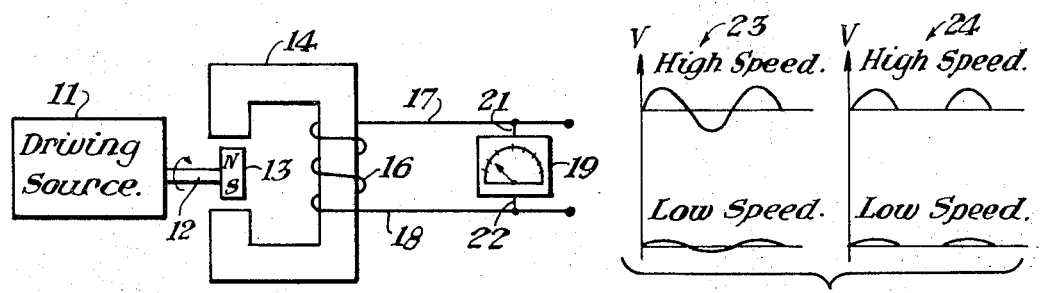
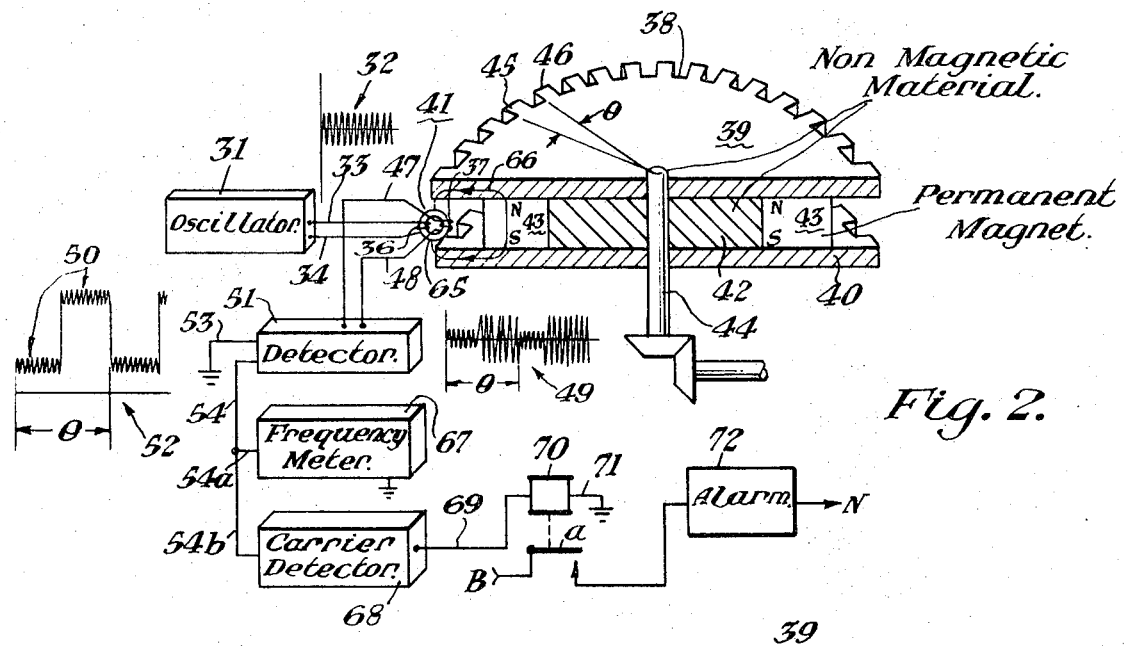
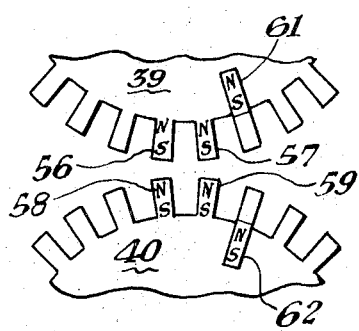

3,559,064
VELOCITY INDICATION DEVICE WITH ZERO SPEED DETECTION CAPABILITY
Reed H. Grundy, Murrysville, Pa., assignor to Westinghouse Air Brake Company, Swissvale, Pa., a corporation of Pennnsylvania
Filed Apr. 25, 1968, Ser. No. 724,041
Int. Cl. G01p 3/48
U.S. Cl. 324—173       29 Claims

ABSTRACT OF THE DISCLOSURE

This invention relates to a pulse generator for producing electrical pulses where a rotor, possessing flux distribution qualities such that there exists at least one region of high flux density surrounded by regions of low flux density when in the presence of a magnetic field, is rotated in the vicinity of an inductor means. The rotor includes at least one magnetic means which defines one of the regions of high flux density. The inductor means has input and output terminals. A signal is impressed on the input terminals. Upon rotor rotation, electrical pulses appear at the output terminals of the inductor means. An output signal for any rotational speed is attained when the inductor means is a saturable inductor. The pulse generator is extremely compact, simple in mechanical layout, and has high resolution properties.

---

My invention relates to a pulse generator for producing electrical pulses.

More specifically, my invention relates to a pulse generator for producing electrical pulses and includes a rotor and at least one inductor means. The above-mentioned rotor possesses flux distribution qualities such that there exists at least one region of high flux density surrounded by regions of low flux density when in the presence of a magnetic field. This rotor includes at least one magnetic means which defines one of the regions of high flux density, and which has first and second portions magnetized in such a way that the first portion is of one polarity while the second portion is of the opposite polarity.

The above-mentioned inductor means has input and output terminals with a signal being impressed on the input terminals. The inductor is positioned adjacent to the rotor so that electrical pulses are produced at the output terminals of the inductor in accordance with the simultaneous passage of the above-noted first and second portions of the magnetic means. This occurs during the transition from a region of high flux density to a region of low flux density caused by rotational movement of the rotor.

In the past, pulse generators of the tachometer type worked on the principle of the rotation of a magnet, which was usually coupled to a vehicle axle, past an iron core around which an inductive coil was wound. Accordingly, electrical signals were attained which had amplitudes corresponding to the equation known as Faraday's equation, or law, specifically:

$$e = N d\phi / dt$$

where $e$ = voltage or signal amplitude,
$N$ = the number of coil turns,
$\phi$ = magnetic flux linking the coil in webers,
$t$ = time in seconds.

From the above equation it is easily seen by those experienced in the art that the prior art method is acceptable as long as the magnet is rotating at high speeds, since detection becomes increasingly difficult as rotational speed decreases, due to the very small change in flux with respect to time, until there is practically no detection capability at all at zero speed. This undesirable phenomenon could, of course, be bypassed if signals were produced which had extremely high amplitudes, but this would mean that the size of the magnet would have to be relatively large and would complicate the mechanical layout of the generator causing more extensive expense and lower resolution.

One extensive use of the prior art pulse generator is on railroad vehicles, specifically vehicle axles, as a tachometer. As is well known in the art of vehicle tachometers, size, resolution, and economics are of the essence for precise speed detection.

It is therefore an object of this invention to provide a pulse generator which produces electrical pulses which can be detected at any speed.

Another object of this invention is to provide a pulse generator which is small in size and weight and simple in mechanical layout and therefore more economical to construct.

A further object of this invention is to provide a pulse generator which has high resolution properties by the employment of a saturable inductor element in combination with a rotating magnetic field.

Another object of this invention is to provide a pulse generator which provides an output signal at any speed by the utilization of a saturable inductor with a signal impressed thereon in the presence of a rotating magnetic field.

Yet another object of this invention is to provide an extremely compact pulse generator in which an inductive sensing element is physically disposed within the region of the rotating member, the speed of which is to be sensed.

Yet another object of this invention is the ability to provide an indication of zero speed while simultaneously indicating system integrity through the utilization of the presence of a carrier signal which is superimposed on all signal outputs.

Yet another object of this invention is to provide an output voltage of fixed amplitude regardless of speed.

In the attainment of the foregoing objects, a pulse generator has been invented to produce electrical pulses and includes a rotor and at least one step-up saturable core transformer in combination therewith. The rotor has first and second plates which are separated by, and rest uniformly on, a nonmagnetic material. The plates are circular in shape and have at least one tooth per plate lying radially on the circumference of the plates and are rectangular in shape. The teeth of the first plate have equal angular displacement and are equal in number to and lie directly in line with the corresponding teeth of the second plate.

The above-mentioned rotor also possesses flux distribution qualities such that there exists at least one region of high flux density surrounded by regions of low flux density when in the presence of a magnetic field. The rotor includes at least one magnetic means which defines one of the regions of high flux density and has first and second portions magnetized in such a way that the first portion is of one polarity while the second portion is of the opposite polarity.

The above-mentioned step-up saturable core transformer has a saturable core which is toroidal in shape and includes input and output terminals. Furthermore, a signal is impressed on the input terminals. The saturable core transformer is positioned adjacent the rotor so that electrical pulses are produced at the transformer output terminals between the simultaneous passage of the first and second portions of the magnetic means, which in the instant case are the teeth of the plates which have been magnetized by the magnetic means. This occurs during the transition from a region of high flux density to a region of low flux density.

Other objects and advantages of the present invention will become apparent from the ensuing description of illustrative embodiments thereof, in the course of which reference is had to the accompanying drawings in which:

FIG. 1 illustrates a pulse generator of the prior art.

FIG. 1a graphically illustrates two different outputs from the prior art pulse generator of FIG. 1.

FIG. 2 depicts a preferred embodiment of the invention in partial schematic and block diagram form.

FIG. 2a shows a species of a rotor which may be employed in the practice of the invention.

FIG. 2b shows another species of a rotor which may be employed in the practice of the invention.

A description of the above embodiments will follow and then the novel features of the invention will be presented in the appended claims.

Reference is now made to FIG. 1 which illustrates a pulse generator of the prior art. A driving source 11 causes a permanent magnet 13 to rotate with shaft 12, thereby inducing a voltage in coil 16 through iron core 14, and producing an output signal over leads 17 and 18 to a meter 19 which is electrically coupled to leads 17 and 18 via leads 21 and 22. The set of curves 23 in FIG. 1a represent the output signal of the coil 16 before any rectification at high speed and at low speed. The set of curves 24 represent the output signal of the coil 16 after half-wave rectification at high speed and at low speed. It is quite evident that at high speed the detection of the rectified high speed signal may be relatively simple due to the amplitude of the signal; the detection of the low speed rectified signal is quite difficult due to the extremely low amplitudes of the signal generated at the output of coil 16. It is of course well known that the amplitude of the signal output depends upon the number and rate at which the flux lines established by the rotating permanent magnet intersect the iron core member 14.

The amplitude of the low speed output signal could of course be increased by increasing the size of the permanent magnet 13, thereby increasing the amount of magnetic flux which would cut the core 14 and thereby induce in coil 16 a greater output, but this would become quite costly and at the same time would increase the complexity of the mechanical layout of the pulse generator. This problem, therefore, gives rise to the pulse generator of the present invention which provides an answer to these problems in a simple but highly unique fashion.

Reference is now made to FIG. 2 wherein the pulse generator of the present invention is depicted. An oscillator 31 provides an input signal shown in curve 32 to the primary 36 of the saturable core transformer 41 over leads 33 and 34. This oscillator may be of a conventional type and typically have an output of 50 kHz. It is therefore seen that we have a continuous input signal at the primary 36 of the saturable core transformer 41. A rotor 38 is rotated in the vicinity of the saturable core transformer 41. The physical structure of the rotor will now be described. The rotor 38 includes two magnetizable plates, a first plate 39 and a second plate 40, upon which there are a plurality of teeth, such as teeth 45 and 46. It should be stated that there may indeed be more or less than the number of teeth shown on the plates of FIG. 2.

It should also be noted that the rotor 38 has been shown in half section. Although the rotor is shown to possess a circular shape, it could well be that the rotor may take on any permissible shape as long as the parameters of the present invention as described more fully hereafter are always present. This also holds true for the physical dimensioning of the teeth of the rotor which are shown in FIG. 2 in one form as rectangular teeth.

The plates 39 and 40 of the rotor 38 are separated by a nonmagnetic separating material 42 which may be ceramic or nonmagnetizable metal and also by an annular permanent magnet 43 which has at one face a polarity denoted by N for north and at the other face an opposite polarity denoted by S for south. It is therefore evident that, since the first plate 39 and the second plate 40 are of a magnetizable material such as soft iron, there will be a magnetic flux path through each of the teeth as shown by the flux line 66. Accordingly, as the rotor 38 is rotated in the vicinity of the saturable core transformer 41 by axle or driving member 44, which member must of course be of a nonmagnetizable composition, the permanent magnet 43 with its flux pattern such as that just noted and shown by the flux line 66 will traverse the plate 39, intersect the saturable core transformer 41 and return to and through the plate 40. This only occurs when the saturable core transformer 41 is in the vicinity of the directly aligned teeth of the plates 39 and 40 of rotor 38. Should the saturable core transformer 41 be in the vicinity of the space between the directly aligned teeth of plates 39 and 40 of rotor 38, then there will be an incomplete path presented by the air gap between the teeth of the plates 39 and 40, thereby preventing any large amount of flux to traverse the saturable core transformer 41.

When these lines of flux, such as flux line 66, do traverse the saturable core transformer 41, they saturate the saturable core 65 of saturable core transformer 41 and thus prevent most of the signal from occurring at the secondary 37 of the saturable core transformer 41 and through the leads 47 and 48. The presence of a small signal at saturation and its usefulness will be explained more fully hereafter.

Thus for the amount of time in which the saturable core transformer 41 is in the vicinity of the directly aligned teeth of plates 39 and 40 of rotor 38, the core 65 of the transformer will be substantially saturated, so that there is a small but distince signal induced in winding 37 from the presence of the oscillator signal in winding 36. However, when the saturable core transformer 41 is in the vicinity of the spaces between the directly aligned teeth of plates 39 and 40, the core 65 will be unsaturated and under these conditions there is a relatively large signal in winding 37 due to the oscillator 31. Hence, we have an electrical pulsating effect due to the relative movement of the physical arrangement of the rotor 38 in reference to the saturable core transformer 41. This signal pattern is shown by curve 49.

When the extremely large pulses do exist, that is, when the saturable core transformer 41 is in the vicinity of the spaces between the directly aligned teeth of plates 39 and 40, a signal will be produced on leads 47 and 48 and will be fed directly to detector 51. This detector may consist of a level detector which has an output which is the envelope of the oscillating pulse train defined by the passage of the space between the teeth. The signal on leads 47 and 48 as noted above is shown by the curve 49. It should be stated now that the time duration between pulses is directly dependent upon the distance or angle $\theta$ between the leading edge of any two consecutive rotor teeth. That is, the further apart the teeth are spread the longer the pulse will be present. After the signal is fed into the detector 51 via leads 47 and 48, the output signal of the detector 51 on the leads 53 and 54 will be as shown by the curve 52.

A study of curve 52 reveals that the general shape of the pulse train from the detector 51 is that of a square wave but due to the presence of the 50 kHz. signal from the oscillator 31 there will always be superimposed on the square wave the 50 kHz. carrier which is depicted by the fluctuations as shown superimposed on the pulse train 52. The presence of this carrier and its importance will now be set forth. A review of the prior art will reveal that the pulse generator of the tachometer type fails to provide a reliable indication of whether or not the speed being sensed is at zero or if there has been some failure in the circuitry involved. Therefore, whenever there is a zero reading there is always an element of uncertainty as to the accuracy of this reading. In the instant invention this uncertainty is removed because of the presence of the superimposed carrier signal 50 on the pulse train or carrier 52. This carrier signal is constantly being detected by the carrier detector 68 which is electrically connected to the detector 51 over the leads 54 and 54b. This carrier detector may be comprised of a high pass filter which will only recognize the carrier signals which are 50 kHz. or more. It should be understood that while not shown, there is included an amplifier within the carrier detector 68. Therefore, at all times during the employment of the pulse generator whether at operating speeds or at zero velocity the carrier must be present or an indication of circuit failure and system integrity must be provided. This indication of circuit failure is accomplished by a relay and alarm arrangement now to be described.

The carrier detector 68 has emanating therefrom an output lead 69 which enters a relay 70 and thence to ground via lead 71 to complete a circuit which maintains the relay 70 energized at all times including the time a zero velocity is being recorded. Should a failure in any circuit occur or in the oscillator 31, then this carrier frequency would not be detected and the relay 70 would be deenergized and a circuit would be completed from battery terminal B over the front contact $a$ of the relay 70 and thence to an alarm 72 and battery terminal N. This alarm may be any conventional alarm of the audio or audio visual type.

Positioned immediately above the carrier detector 68 is a frequency meter 67 which is connected electrically to detector 51 by leads 54 and 54a. The pulse train 52 is delivered over these leads and the frequency meter which is a conventional item will produce an indication representative of speed.

Thus it is seen that the magnitude of the output signal is independent of the rotating speed of the rotor 38. Furthermore, since there is always an oscillating signal present on the saturable core 41 when the rotor 38 slows to a stop, there will always be either a large distinct signal output from the detector 51 or a small distinct signal output.

Reference is now made to FIG. 2a which sets forth an alternate rotor embodiment. Plate 39 has been rotated through an angle of 180 degrees in order to demonstrate the relative tooth arrangement of plates 39 and 40. It can be seen from FIG. 2a that instead of having an annular permanent magnet which separates the two plates 39 and 40 of rotor 38, as in FIG. 2, there exist on the teeth, specifically teeth 56, 57, 58 and 59, smaller permanent magnets which have been aligned such that lines of magnetic flux will cross the teeth in the same way as flux line 66 did as depicted in FIG. 2. Also, small permanent magnets, such as magnets 61 and 62, may be placed adjacent the periphery of the circular plates 39 and 40 and produce the same magnetic flux effect that is depicted in FIG. 2.

Reference is now made to FIG. 2b which sets forth still another alternate rotor embodiment. In the case of FIG. 2b the plates 39 and 40 of the rotor 38 are themselves magnetized such that the bottom face of the plate 39 is of one polarity, say south, while the upper face of plate 40 is of the opposite polarity, say north, both plates being separated by a nonmagnetic separating material 42. Accordingly, the flux lines, such as flux line 66, are in a similar fashion produced by the arrangement shown in FIG. 2.

While not illustrated here it is to be understood that the teeth need not lie pointing toward the circumference on radial lines, but might be positioned at right angles to the plates 39 and 40. This would of course require that one of the plates be longer in diameter in order that the teeth positioned perpendicular to the plates would be disposed in a parallel relationship with sufficient room therebetween for the saturable transformer.

Obviously, certain modifications and variations of the invention as hereinbefore set forth may be made without departing from the spirit and scope thereof, and therefore only such limitations should be imposed as are indicated in the appended claims.

I claim:
1. A pulse generator for producing electrical pulses and including in combination:
   (a) a rotor possessing flux distribution qualities such that there exists at least one peripheral region of high flux density surrounded by peripheral regions of low flux density when in the presence of a magnetic field, said rotor including at least one magnetic means which defines one of said regions of high flux density, said magnetic means having first and second portions magnetized in such a way that said first portion of said magnetic means is of one polarity while said second portion of said magnetic means is of the opposite polarity,
   (b) at least one inductive means having input and output terminals, an A.C. signal source to provide an A.C. signal to said input terminals, said inductive means positioned adjacent said rotor so that said A.C. signal on said input terminals of said inductive means is amplitude modulated at said output terminals of said inductive means in accordance with variance of the magnetic field in said inductive means by rotational movement of said rotor, said amplitude modulated signal including a carrier signal having thereon a frequency proportional to the frequency of said A.C. signal on said input terminals of said inductive means, said A.C. signal appearing on said input terminals of said inductive means unmodulated at said output terminals of said inductive means whenever said rotor is motionless, said unmodulated signal being at the same frequency as that of said carrier signal, said pulse generator further including in combination means coupled to said output terminals of said inductive means which includes first means to detect the envelope of said amplitude modulated signal to provide an indication of the rotational movement of said rotor and includes second means to detect said carrier signal thereby providing an indication of the circuit integrity of said pulse generator.

2. The pulse generator of claim 1 wherein said rotor has a first and second plate, said plates being separated by and resting uniformly on a separating material.

3. The pulse generator of claim 2 wherein said separating material is nonmagnetic.

4. The pulse generator of claim 2 wherein said plates each have at least one tooth-shaped member at the periphery of said plates said teeth lying at an angle to the axis of rotation of said plates.

5. The pulse generator of claim 2 wherein said plates are circular in shape, having at least one tooth per plate, said teeth lying radially on the circumference of said plates.

6. The pulse generator of claim 5 wherein said teeth are rectangular in shape.

7. The pulse generator of claim 4 wherein said teeth of said first plate are equal to in number and lie directly in line with the corresponding teeth of said second plate.

8. The pulse generator of claim 3 wherein said plates are magnetized in such a fashion that said first plate is of one polarity while said second plate is of opposite polarity thereby providing said magnetic means.

9. The pulse generator of claim 7 wherein said teeth are magnetized in such a fashion that the teeth of said first plate alternate in opposing polarities, while the teeth of said second plate also alternate in opposing polarities and lie directly in line respectively with the teeth of opposing polarities on said first plate, to thereby provide said magnetic means.

10. The pulse generator of claim 1 wherein said magnetic means is a permanent magnet.

11. The pulse generator of claim 10 wherein said permanent magnet separates said first and second portions of said rotor, and is located within the outer periphery of said rotor, said permanent magnet having polarized faces, said polarized faces of said permanent magnet being in uniform contact with said first and second portions of said rotor, and providing for the establishment of said regions of high and low flux density.

12. The pulse generator of claim 1 wherein said inductor means is a saturable core transformer, said saturable core transformer being a step-up transformer.

13. The pulse generator of claim 12 wherein said saturable core transformer has a saturable core which is toroidal in shape.

14. The pulse generator of claim 12 wherein said first and second portions of said rotor are separated by a dimension greater than the maximum width of said saturable core transformer.

15. The pulse generator of claim 1 wherein a plane cutting said inductor means at right planar angles is at right planar angles to a plane passed perpendicularly through said rotor.

16. The pulse generator of claim 1 wherein said rotational movement is initiated by a vehicle axle which is mechanically coupled to said rotor.

17. The pulse generator of claim 5 wherein said rotational movement is initiated by a vehicle axle which is mechanically coupled to the center of said rotor.

18. The pulse generator of claim 5 wherein the angular displacement of said teeth determines the number and length of said electrical pulses.

19. The pulse generator of claim 18 wherein said teeth have equal angular displacement.

20. A pulse generator for producing electrical pulses and including in combination:
(a) a rotor having first and second plates, said plates being separated by and resting uniformly on a non-magnetic material, said plates being circular in shape, having at least one tooth per plate, said teeth lying radially on the circumferences of said plates and being rectangular in shape, said teeth having equal angular displacement, said teeth of said first plate being equal to in number and lying directly in line with the corresponding teeth of said second plate,
said rotor also possessing flux distribution qualities such that there exists at least one peripheral region of high flux density surrounded by peripheral regions of low flux density when in the presence of a magnetic field, said rotor including at least one magnetic means which defines one of said regions of high flux density, said magnetic means having first and second portions magnetized in such a way that said first portion of said magnetic means is of one polarity while said second portion of said magnetic means is of the opposite polarity.
(b) at least one step-up saturable core transformer having a saturable core which is toroidal in shape, said saturable core transformer having input and output terminals, an A.C. signal source to provide an A.C. signal to said input terminals, said saturable core transformer positioned adjacent said rotor so that said A.C. signal on said input terminals of said saturable core transformer is amplitude modulated at said output terminals of said saturable core transformer in accordance with saturation and nonsaturation of said saturable core by rotational movement of said rotor, said amplitude modulated signal including a carrier signal having thereon a frequency proportional to the frequency of said A.C. signal on said input terminals of said saturable core transformer, said A.C. signal appearing on said input terminals of said saturable core transformer unmodulated at said output terminals of said saturable core transformer whenever said rotor is motionless, said unmodulated signal being at the same frequency as that of said carrier signal,
said pulse generator further including in combination means coupled to said output terminals of said saturable core transformer which includes first means to detect the envelope of said amplitude modulated signal to provide an indication of the rotational movement of said rotor and includes second means to detect said carrier signal thereby providing an indication of the circuit integrity of said pulse generator.

21. The pulse generator of claim 20 wherein said plates are magnetized in such a fashion that said first plate is of one polarity while said second plate is of opposite polarity thereby providing said magnetic means.

22. The pulse generator of claim 20 wherein said teeth are magnetized in such a fashion that the teeth of said first plate alternate in opposing polarities, while the teeth of said second plate also alternate in opposing polarities, and concurrently lie directly in line respectively with the teeth of opposing polarities on said first plate thereby providing said magnetic means.

23. The pulse generator of claim 20 wherein said magnetic means is a permanent magnet.

24. The pulse generator of claim 23 wherein said permanent magnet separates said plates, and is located within the outer periphery of said rotor, said permanent magnet having polarized faces, said polarized faces of said permanent magnet being in uniform contact with said first and second plates, and in radial alignment with said teeth, the thickness of said permanent magnet being equal to the thickness of said separating material, said arrangement thereby establishing said high flux density region which includes said teeth.

25. The pulse generator of claim 24 wherein said plates are separated by a dimension greater than the maximum width of said saturable core transformer.

26. The pulse generator of claim 20 wherein a plane cutting said saturable core transformer at right planar angles is at right planar angles to a plane passed perpendicularly through said rotor.

27. The pulse generator of claim 20 wherein said rotational movement is initiated by a vehicle axle which is mechanically coupled to said rotor.

28. The pulse generator of claim 27 wherein said vehicle axle is mechanically coupled to the center of said rotor.

29. The pulse generator of claim 20 wherein the angular displacement of said teeth determines the number and length of said electrical pulses.

References Cited

UNITED STATES PATENTS

| 2,630,529 | 3/1953 | Mann | 324—70 |
| 3,002,384 | 10/1961 | MacDonald | 324—70 |
| 3,342,070 | 9/1967 | Walch | 73—231 |

MICHAEL J. LYNCH, Primary Examiner

U.S. Cl. X.R.

340—253